United States Patent
Bullock et al.

(10) Patent No.: US 6,526,349 B2
(45) Date of Patent: *Feb. 25, 2003

(54) METHOD OF COMPILING NAVIGATION ROUTE CONTENT

(75) Inventors: James Blake Bullock, Gilbert, AZ (US); J. Scott Geranen, Phoenix, AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/839,070

(22) Filed: Apr. 23, 2001

(65) Prior Publication Data

US 2002/0156572 A1 Oct. 24, 2002

(51) Int. Cl.⁷ .............................................. G06F 165/00
(52) U.S. Cl. ...................... 701/209; 701/200; 73/178 R
(58) Field of Search .................. 701/209, 201, 701/202, 200, 1; 73/178 R

(56) References Cited

U.S. PATENT DOCUMENTS

| | | | | |
|---|---|---|---|---|
| 5,058,023 A | * | 10/1991 | Kozikaro | 701/217 |
| 5,067,081 A | * | 11/1991 | Person | 701/202 |
| 5,233,527 A | * | 8/1993 | Shinnosuke | 701/28 |
| 5,262,775 A | * | 11/1993 | Tamai et al. | 340/988 |
| 5,714,948 A | * | 2/1998 | Farmakis et al. | 340/961 |
| 5,796,613 A | * | 8/1998 | Kato et al. | 701/214 |
| 5,818,356 A | * | 10/1998 | Schuessler | 340/905 |
| 5,841,399 A | * | 11/1998 | Yu | 342/357.02 |
| 5,845,228 A | * | 12/1998 | Uekawa et al. | 340/990 |
| 5,890,092 A | * | 3/1999 | Kato et al. | 701/216 |
| 5,897,602 A | * | 4/1999 | Mizuta | 701/201 |
| 5,905,451 A | * | 5/1999 | Sakashita | |
| 5,911,773 A | * | 6/1999 | Mutsuga et al. | 701/28 |
| 5,926,118 A | * | 7/1999 | Hayashida et al. | |
| 6,151,551 A | * | 11/2000 | Geier et al. | |
| 6,154,714 A | * | 11/2000 | Lepejian | 702/118 |
| 6,169,516 B1 | * | 1/2001 | Watanabe et al. | 342/357.13 |
| 6,188,957 B1 | * | 2/2001 | Bechtolsheim et al. | 701/209 |
| 6,192,314 B1 | * | 2/2001 | Khavakh et al. | 701/209 |
| 6,199,013 B1 | * | 3/2001 | OaShea | 701/211 |
| 6,236,365 B1 | * | 5/2001 | LeBlanc et al. | |
| 6,236,933 B1 | * | 5/2001 | Lang | 701/117 |
| 6,298,303 B1 | * | 10/2001 | Khavakh et al. | 701/209 |
| 6,317,686 B1 | * | 11/2001 | Ran | 701/117 |

* cited by examiner

Primary Examiner—William A. Cuchlinski, Jr.
Assistant Examiner—Olga Hernandez
(74) Attorney, Agent, or Firm—Kevin D. Wills

(57) ABSTRACT

A method of compiling navigation route content (202) in a distributed communications system (100) includes defining a navigation route (306) between a starting location (302) and a destination location (304) that is comprised a plurality of route links (320–332) and defined by a user of a remote communications node (104). The plurality of route links (320–332) are monitored and navigation route content (202) is recorded for each of the route links. Navigation route content (202) is compiled by a navigation route algorithm (204) and navigation route data (206) is calculated for the navigation route (306) between starting location (302) and destination location (304).

36 Claims, 5 Drawing Sheets

METHOD OF COMPILING NAVIGATION ROUTE CONTENT

FIELD OF THE INVENTION

This invention relates generally to compiling navigation route content in a distributed communications system and, in particular to a method of optimizing navigation route content in a distributed communications system.

BACKGROUND OF THE INVENTION

Vehicle drivers seek to find the optimum routes from their origin point to their destination point so they can minimize travel time and fuel consumption. Current methods for finding optimum routes are based on static digital road map databases and limited real-time traffic monitoring equipment. Typically, the road map data is used to compute optimal routes based on estimated travel times from the road classification and/or speed limit data. This method has the disadvantage in that the data may not reflect the actual travel times because of stop signs, normal traffic patterns, weather and road conditions, accidents, construction, and the like. Real-time traffic monitoring equipment is currently available only on some major freeways and arteries. This leaves potential routes out of reach of real-time traffic monitoring and hence unreliable for incorporation into a route optimization scheme.

Optimum routes are generally computed based on weighting strategies for road segments and intersections. The real-time traffic information is treated as a dynamic weight for the individual road segments affected and routes can be computed taking the traffic into consideration where available. These route calculation methods are based on available static data and limited real-time traffic information. This has the disadvantage of improper weighting of road segments due to a lack of real-time traffic data for any given time of the day or week, which in turn creates sub-optimal routing schemes.

Accordingly, there is a significant need for methods of compiling navigation route information and subsequent route optimization that overcome the deficiencies of the prior art outlined above.

BRIEF DESCRIPTION OF THE DRAWINGS

Referring to the drawing.

Figure 1:
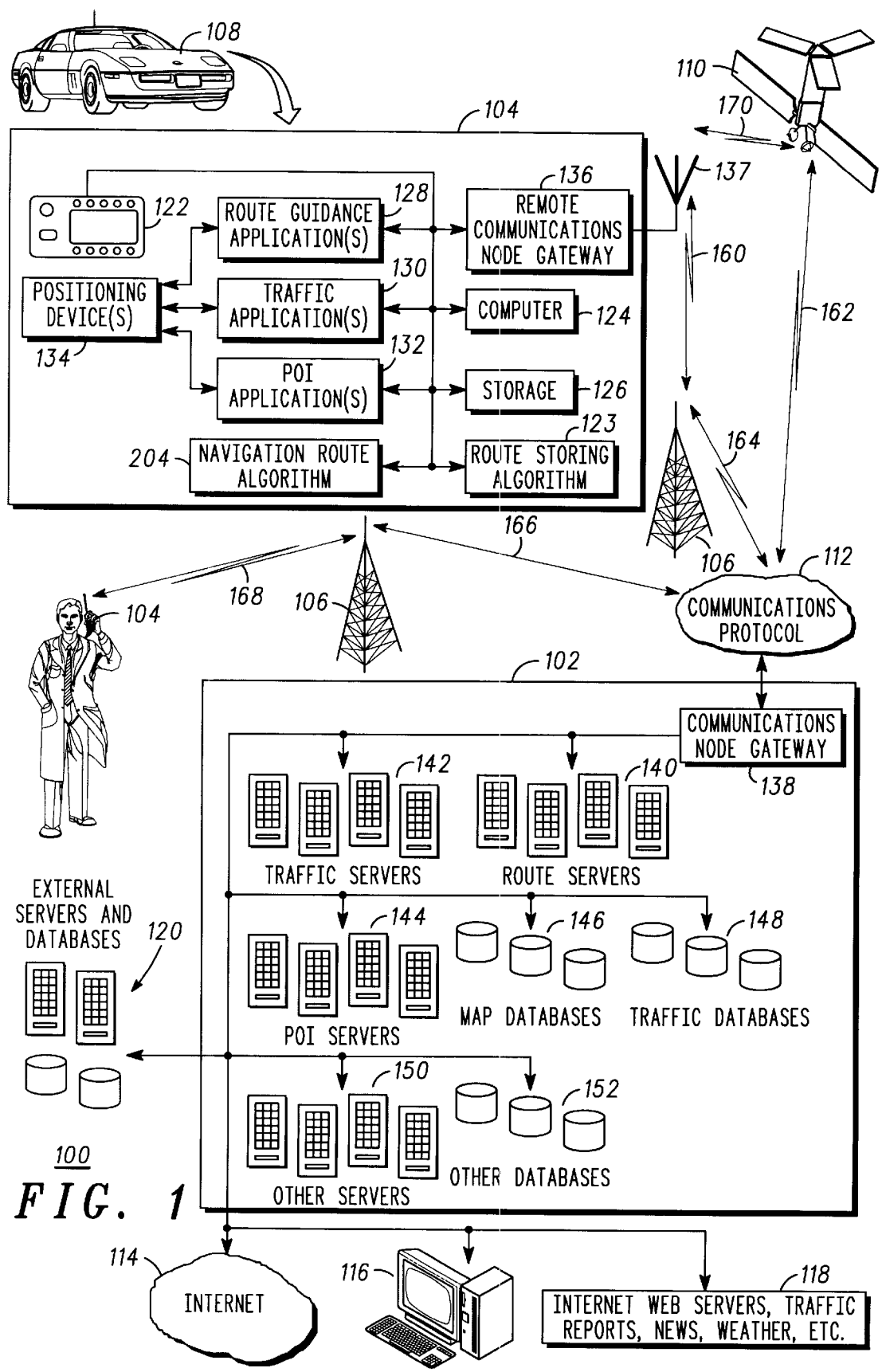
FIG. 1 depicts an exemplary distributed communications system, according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

The present invention is a method of compiling navigation route content with software components running on mobile client platforms and on remote server platforms. To provide an example of one context in which the present invention may be used, an example of a method of compiling navigation route content will now be described. The present invention is not limited to implementation by any particular set of elements, and the description herein is merely representational of one embodiment. The specifics of one or more embodiments of the invention are provided below in sufficient detail to enable one of ordinary skill in the art to understand and practice the present invention.

FIG. 1 depicts an exemplary distributed communications system 100 according to one embodiment of the invention. Shown in FIG. 1 are examples of components of a distributed communications system 100, which comprises among other things, a communications node 102 coupled to a remote communications node 104. The communications node 102 and remote communications node 104 can be coupled via a communications protocol 112 that can include standard cellular network protocols such as GSM, TDMA, CDMA, and the like. Communications protocol 112 can also include standard TCP/IP communications equipment. The communications node 102 is designed to provide wireless access to remote communications node 104, to enhance regular video and audio broadcasts with extended video and audio content, and provide personalized broadcast, information and applications to the remote communications node 104.

Communications node 102 can also serve as an Internet Service Provider to remote communications node 104 through various forms of wireless transmission. In the embodiment shown in FIG. 1, communications protocol 112 is coupled to local nodes 106 by either wireline link 166 or wireless link 164. Communications protocol 112 is also capable of communication with satellite 110 via wireless link 162. Content is further communicated to remote communications node 104 from local nodes 106 via wireless link 160, 168 or from satellite 110 via wireless link 170. Wireless communication can take place using a cellular network, paging network, FM sub-carriers, satellite networks, and the like. The components of distributed communications system 100 shown in FIG. 1 are not limiting, and other configurations and components that form distributed communications system 100 are within the scope of the invention.

Remote communications node 104 without limitation can include a wireless unit such as a cellular or Personal Communication Service (PCS) telephone, a pager, a hand-held computing device such as a personal digital assistant (PDA) or Web appliance, or any other type of communications and/or computing device. Without limitation, one or more remote communications nodes 104 can be contained within, and optionally form an integral part of a vehicle 108, such as a car, truck, bus, train, aircraft, or boat, or any type of structure, such as a house, office, school, commercial establishment, and the like. As indicated above, a remote communications node 104 can also be implemented in a device that can be carried by the user of the distributed communications system 100.

Communications node 102 can also be coupled to other communications nodes (not shown for clarity), the Internet 114, Internet web servers 118 and external severs and databases 120. Users of distributed communications system 100 can create user-profiles and configure/personalize their user-profile, enter data, and the like through a user configuration device 116, such as a computer. Other user configuration devices 116 are within the scope of the invention and can include a telephone, pager, PDA, Web appliance, and the like. User-profiles and other configuration data is preferably sent to communications node 102 through a user configuration device 116, such as a computer with an Internet connection 114 using a web browser as shown in FIG. 1. For example, a user can log onto the Internet 114 in a manner generally known in the art and then access a configuration web page of the communications node 102. Once the user has configured the web page selections as desired, he/she can submit the changes. The new configuration, data, preferences, and the like, including an updated user-profile, can then be transmitted to remote communications node 104 from communications node 102.

As shown in FIG. 1, communications node 102 can comprise a communications node gateway 138 coupled to various servers and software blocks, such as, traffic servers 142, route servers 140, and point-of-interest (POI) servers 144, and the like. The various servers depicted in FIG. 1 can comprise a processor with associated memory. Memory comprises control algorithms, and can include, but is not limited to, random access memory (RAM), read only memory (ROM), flash memory, and other memory such as a hard disk, floppy disk, and/or other appropriate type of memory. Communications node 102 can initiate and perform communications with remote communication nodes 104, user configuration devices 116, and the like, shown in FIG. 1 in accordance with suitable computer programs, such as control algorithms stored in memory. Servers in communications node 102, while illustrated as coupled to communications node 102, could be implemented at any hierarchical level(s) within distributed communications system 100. For example, route servers 140 could also be implemented within other communication nodes, local nodes 106, the Internet 114, and the like.

Traffic servers 142 can contain traffic information including, but not limited to, traffic reports, traffic conditions, speed data, and the like. Route servers 140 can contain information including, but not limited to, digital road map data, route alternatives, route guidance, route algorithms, route storing algorithms, and the like. Communications node gateway 138 is also coupled to map databases 146, which can comprise distributed map database and traffic databases 148. Map databases 146 contain additional digital roadmap data. Traffic databases 148 can contain traffic information, for example, traffic conditions, road closures, construction, and the like. POI servers 144 can contain information for points of interests such as gasoline stations, restaurants, motels, movie theaters, and the like.

Each of traffic servers 142, route servers 140, and POI servers 144 can send and receive content data from external servers and databases 120 such as local traffic reports, news agencies, and the like, in addition to content data already stored at communications node 102.

Communications node 102 can also comprise any number of other servers 150 and other databases 152. Other servers 150 can include, for example, wireless session servers, content converters, central gateway servers, personal information servers, and the like. Other databases 152 can include, for example, customer databases, broadcaster databases, advertiser databases, user-profile databases, and the like.

Communications node gateway 138 is coupled to remote communications node gateway 136. Remote communications node gateway 136 is coupled to various navigation applications, which can include, without limitation, route guidance application(s) 128, traffic application(s) 130, POI application(s) 132, navigation route algorithm 204, route storing algorithm 123, and the like. Navigation applications 128, 130, 132, 204, 123 are coupled to, and can process data received from internal and external positioning device(s) 134. Internal positioning device(s) 134 are located within remote communications node 104 or vehicle 108 and can include, for example global positioning system (GPS) unit (s), speedometer, compass, gyroscope, altimeter, and the like. Examples of positioning device(s) 134 external to remote communications node 104 are, without limitation, differential GPS, network-assisted GPS, wireless network positioning systems, and the like.

Remote communications node 104 comprises a user interface device 122 comprising various human interface (H/I) elements such as a display, a multi-position controller, one or more control knobs, one or more indicators such as bulbs or light emitting diodes (LEDs), one or more control buttons, one or more speakers, a microphone, and any other H/I elements required by the particular applications to be utilized in conjunction with remote communications node 104. User interface device 122 is coupled to navigation applications 128, 130, 132 and can request and display route guidance data including, navigation route data, digital roadmap data, and the like. The invention is not limited by the user interface device 122 or the (H/I) elements depicted in FIG. 1. As those skilled in the art will appreciate, the user interface device 122 and (H/I) elements outlined above are meant to be representative and to not reflect all possible user interface devices or (H/I) elements that may be employed.

As shown in FIG. 1, remote communications node 104 comprises a computer 124, preferably having a microprocessor and memory, and storage devices 126 that contain and run an operating system and applications to control and communicate with onboard peripherals.

Remote communications node 104 can optionally contain and control one or more digital storage devices 126 to which real-time broadcasts and navigational data can be digitally recorded. The storage devices 126 may be hard drives, flash disks, or other storage media. The same storage devices 126 can also preferably store digital data that is wirelessly transferred to remote communications node 104 in faster than real-time mode.

In FIG. 1, communications node 102 and remote communications node 104, perform distributed, yet coordinated, control functions within distributed communications system 100. Elements in communications node 102 and elements in remote communications node 104 are merely representative, and distributed communications system 100 can comprise many more of these elements within other communications nodes and remote communications nodes.

Software blocks that perform embodiments of the invention are part of computer program modules comprising computer instructions, such as control algorithms, that are stored in a computer-readable medium such as memory described above. Computer instructions can instruct processors to perform methods of operating communications node 102 and remote communications node 104. In other embodiments, additional modules could be provided as needed.

The particular elements of the distributed communications system 100, including the elements of the data processing systems, are not limited to those shown and described, and they can take any form that will implement the functions of the invention herein described.

Figure 2:
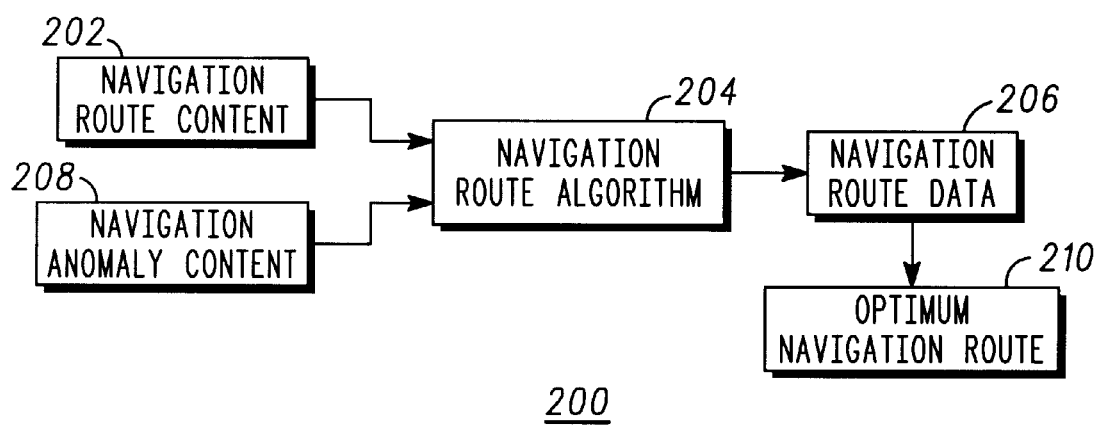
FIG. 2 illustrates a simplified block diagram depicting a method of compiling navigation route content, according to one embodiment of the invention.

FIG. 2 illustrates a simplified block diagram 200 depicting a method of compiling navigation route content 202, according to one embodiment of the invention. As shown in FIG. 2, navigation route content 202 and navigation anomaly content 208 are input into navigation route algorithm 204 in order to output navigation route data 206. Subsequently, navigation route data 206 is processed to output an optimum navigation route 210. Navigation route data 206 and optimum navigation route 210 can be communicated to remote communications node 104 and user configuration device 116.

Navigation route content 202 can include, without limitation, position data, velocity data, time data, and the like, received real-time from any portion of a navigation route traveled by remote communications node 104 or selected by a user via user configuration device 116. Examples of time data include, but are not limited to total travel time of the navigation route 306, intermediate travel times of individual route links, time of day, day of the week, and the like. Examples of velocity data include, but are not limited to average velocity, instantaneous velocity, and the like, which can also be for a given time of day or day of the week. Position data can include two-dimensional or three-dimensional coordinate data of the position of remote communications node 104. Navigation route content 202 is based on a navigation route defined by a user of remote communications node 104 in a distributed communications system 100.

Navigation anomaly data 208 can include real-time traffic data collected using installed sensors along or in the road, video cameras, accident reports, airborne traffic monitors, and the like. Traffic incidents such as accidents, stalls, construction, weather, delays, and the like, are reported with a location associated with a road segment in a digital map database.

Navigation route data 206 can include, without limitation, information on route links associated with a particular navigation route. For example, navigation route data 206 can include position data, velocity data, time data and the like already collected from remote communications node 104. Navigation route data 206 can also include historical travel time data from traffic observations aggregated over time from one or more users. Navigation route data 206 can also include data from static digital road map databases, road segments, route links, and the like. Road segments are elements in a digital road map database that represent route links in the actual road network. Route links are defined as sections of the roadway between intersections. Route links are road segments that are incorporated into a computed or defined navigation route. Navigation route data 206 computed by navigation route algorithm 204 can be processed to provide optimum navigation route 210, which can be a set of route links that optimizes or minimizes travel time, travel distance, and the like, between a starting location and a destination location. The invention is not limited to minimizing travel time or distance traveled. Other factors can also be maximized, minimized, and the like, and are within the scope of the invention.

Navigation route algorithm 204 receives at least the inputs depicted in FIG. 2 and compiles and analyzes navigation route content 202, navigation anomaly content 208, and the like, to output navigation route data 206 and calculate optimum navigation route 210. One method navigation route algorithm 204 can use to accomplish this is to apply a weighting strategy to arrive at optimized navigation route between two locations. Navigation route algorithm 204 can calculate an optimum navigation route 210 between two locations by applying a weighting scheme to each of the plurality of road segments in the navigation route data 206 using each component of navigation route content 202 and navigation anomaly content 208. By applying a weight to each of these components for each road segment based on the relative importance of the component or the relative accuracy of the content, an optimum navigation route 210 can be calculated for a given starting location and destination location. By continually incorporating navigation route content 202 and navigation anomaly content 208 into navigation route algorithm 204, the database of components of data available for the plurality of road segments of a given roadway network are expanded and the accuracy of any given optimum navigation route 210 is improved. Navigation route algorithm 204 is shown in remote communications node 104, however navigation route algorithm 204 can be reside in communications node 102, remote communications node 104 and/or be distributed among any number of such nodes.

Figure 3:
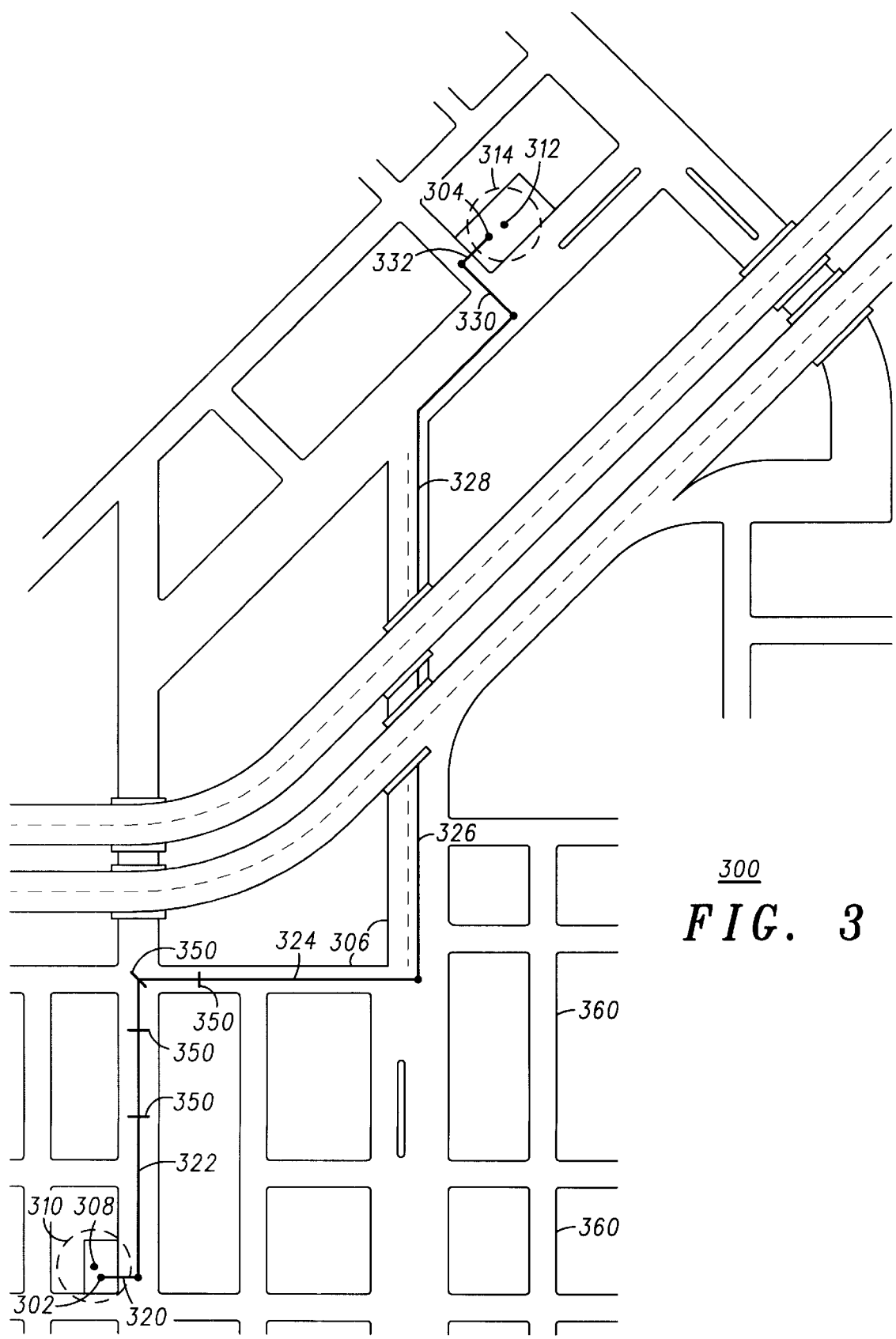
FIG. 3 depicts a simplified roadway network illustrating an exemplary embodiment of the invention.

FIG. 3 depicts a simplified roadway network 300 illustrating an exemplary embodiment of the invention. A starting location 302 and destination location 304 are shown for navigation route 306. Also depicted in FIG. 3 are a previously defined starting location 308 with an associated radius 310 around previously defined starting location 308, and a previously defined destination location 312 with an associated radius 314 around previously defined destination location 312. The simplified roadway network 300 depicted in FIG. 3 can also represent a digital roadmap 360 that is capable of being viewed or stored on remote communications node 104 or user configuration device 116.

In operation, a user of remote communications node 104 defines navigation route 306 between starting location 302 and destination location 304 either directly or indirectly. Navigation route 306 is comprised of a plurality of route links 320, 322, 324, 326, 328, 330 and 332 (hereinafter designated 320–332). The user can define navigation route 306 by, for example, logging onto a trip planning website on distributed communications system 100 via user configuration device 116 and entering starting location 302 and destination location 304. Various routes between starting location 302 and destination location 304 stored in communications node 102, specifically route servers 140, and are communicated to the user. The user can then select a route offered or modify the route by adding and deleting route links as needed. When the navigation route 306 is complete, it is saved at communications node 102 and communicated to remote communications node 104. This is an example of a user directly defining navigation route 306.

As another example of directly defining navigation route 306, a user can activate route storing algorithm 123 on remote communications node 104 at the starting location 302 of a navigation route 306. Remote communications node 104 will then record navigation route content 202 until the user deactivates route storing algorithm 123 at destination location 304. Navigation route 306 is then communicated to communications node 102 and stored for later use.

Another example of defining navigation route includes a user driving a vehicle 108 with remote communications node 104 normally in his/her daily activities. Utilizing positioning devices 134, navigation route algorithm 204 and route storing algorithm 123 in remote communications node 104, the start and stop times, locations, and the like, of remote communications node 104 are recorded, for example, by monitoring the on/off position of the ignition switch of vehicle 108. Starting location 302 is compared to any previously defined starting location 308 and flagged if starting location is within a certain distance or radius 310 of previously defined starting location 308. If starting location is flagged, route storing algorithm 123 will begin recording navigation route content 202. Destination location 304 is compared to any previously defined destination location 312 and flagged if destination location 304 is within a certain distance or radius 314 of previously defined destination location 312. If destination location 304 is flagged, remote communications node 104 and route storing algorithm 123 will end recording of navigation route content 202. Navigation route content 202 for navigation route 306 is then stored and communicated to communications node 102 immediately or at some future time. If destination location 304 is not flagged as being within radius 314 of previously define destination location 312, remote communications node 104 can either keep navigation route content 202 recorded and define a new navigation route 306 or discard navigation route content 202 already recorded since it did not correspond to a previously traveled navigation route. When a recurring route is identified and communicated to communications node 102, the navigation route data 206 can be used to match the specific route links used in the route. This is an example of indirectly defining navigation route 306 by automatically monitoring the driving pattern of an individual user via remote communications node 104. Radius 310, 312 can be defined by a user or be assigned a default value for any particular starting location 302 or destination location 304.

Once a navigation route 306 is defined, plurality of route links 320–332 can be overlaid onto digital roadmap 360 for ease of viewing and editing. The defining coordinates of route links 320–332 can then be communicated to the remote communications node 104. Once a navigation route 306 is communicated to the remote communications node 104, plurality of route links 320–332 traversed by remote communications node 104 are monitored. When the starting location 302 and destination location 304 comport with previously defined starting and destination locations 308, 312 as described above, navigation route content 202 is recorded for each of the plurality of route links 320–332. Navigation route content 202 is recorded at intervals 350 along navigation route 306. Intervals 350 can be regular or irregular and can be defined by a user or automatically via route storing algorithm 123. Intervals 350 can be defined by distance traveled, time elapsed, changes in speed or direction, passing the coordinates of the end points of route links 320–332, and the like. Intervals 350 can also be defined by any distance or time between the end points of route lines 320–332. For example, intervals can be defined at each route alternative, which is at each point along one or more route links 320–332 where an alternate route diverges from route links 320–322. Navigation route content 202 is also communicated to communications node 102 and stored at regular intervals. The distance and/or time between intervals can be adjusted so that route storing algorithm can identify individual route links 320–332 along navigation route 306 to ensure navigation route content 202 is as accurate and precise as possible. In a preferred embodiment, the time to travel between pairs of end points of each route link is stored when the coordinates of the route links are available in remote communications node 104. Using these points to measure the travel times will make it convenient and accurate when the navigation route content 202 is compiled and interpreted by navigation route algorithm 204. As an example, and without limitation, navigation route content 202, which can include time data (time of day, week, etc.), velocity data (speed and direction) and position data (GPS coordinates, and the like) is recorded at intervals and communicated to communications node 102.

Navigation route content 202 can be communicated to communications node 102 at convenient time intervals throughout the day, week, and the like. For example, navigation route content 202 can be communicated to communications node 102 on a daily basis, weekly basis, or when the user of remote communications node 104 is utilizing another service. In one embodiment, navigation route content 202 is communicated to communications node 102 before or after a navigation route 306 is downloaded to remote communications node 104. However, the scope of the invention includes communicating navigation route content 202 to communications node 104 at any time or any number of intervals to provide for efficient communication of navigation route content 202.

Navigation route content 202 for navigation route 306 is compiled into navigation route algorithm 204 where navigation route data 206 is made available to a user via remote communications node 104, user configuration device 116, and the like. Navigation route content 202 can be complied utilizing navigation route algorithm 204 in remote communications node 104, communications node 102 or any combination thereof. Navigation route data 206 can also be made available to users other than those who defined a particular navigation route. This can be in the form of optimum routes between starting location 302 and destination location 304 when other users attempt to configure their own navigation routes. This can also be in the form of optimum routes that comprise one or more route links that are common to navigation route 306 for which navigation route content 202 is available.

Utilizing navigation route data 206, an optimum navigation route 210 can be generated between starting location 302 and destination location 304. Navigation route algorithm 204 can select the plurality of route links 320–332 that minimize travel time, travel distance, and the like, between starting location 302 and destination location 304. When optimizing navigation route 306, navigation route algorithm 204 can incorporate navigation anomaly content including real-time traffic incidents such as accidents, construction, weather and the like. Therefore, an optimum navigation route 210 can change depending on real-time conditions and the continuous input of navigation route content 202 received from users of a specific navigation route 306 between starting location 302 and destination location 304.

Optimum navigation route 210 and navigation route data 206 can also be utilized to predict arrival time at destination location 304 from a given departure time from starting location 302. The arrival time can be updated via remote communications node 104 during the journey as additional navigation route content 202 and navigation anomaly content 208 are received at communications node 102, compiled and communicated to remote communications node 104.

Optimum navigation route 210 and navigation route data 206 can also be utilized to predict an optimum departure time from starting location 302 to destination location 304 that will minimize travel time or distance or the like.

Navigation route data 206 can also be utilized to predict alternate routes besides optimum navigation route 210 that may be more optimum at a given time due to navigation anomaly content 208. The alternate route can be communicated automatically to remote communications node 104 or user configuration device 116.

Navigation route algorithm 204 continuously receives new and updated set of navigation route content 202 to in effect "learn" or "continuously learn" and output updated navigation route data 206 and optimum navigation route 210. As navigation route algorithm 204 receives new or updated navigation route content 202 and navigation anomaly content 208, it can adjust the weighting factors for the available route links 320–332 between starting location 302 and destination location 304 and continuously optimize the resultant computed routes.

Figure 4:
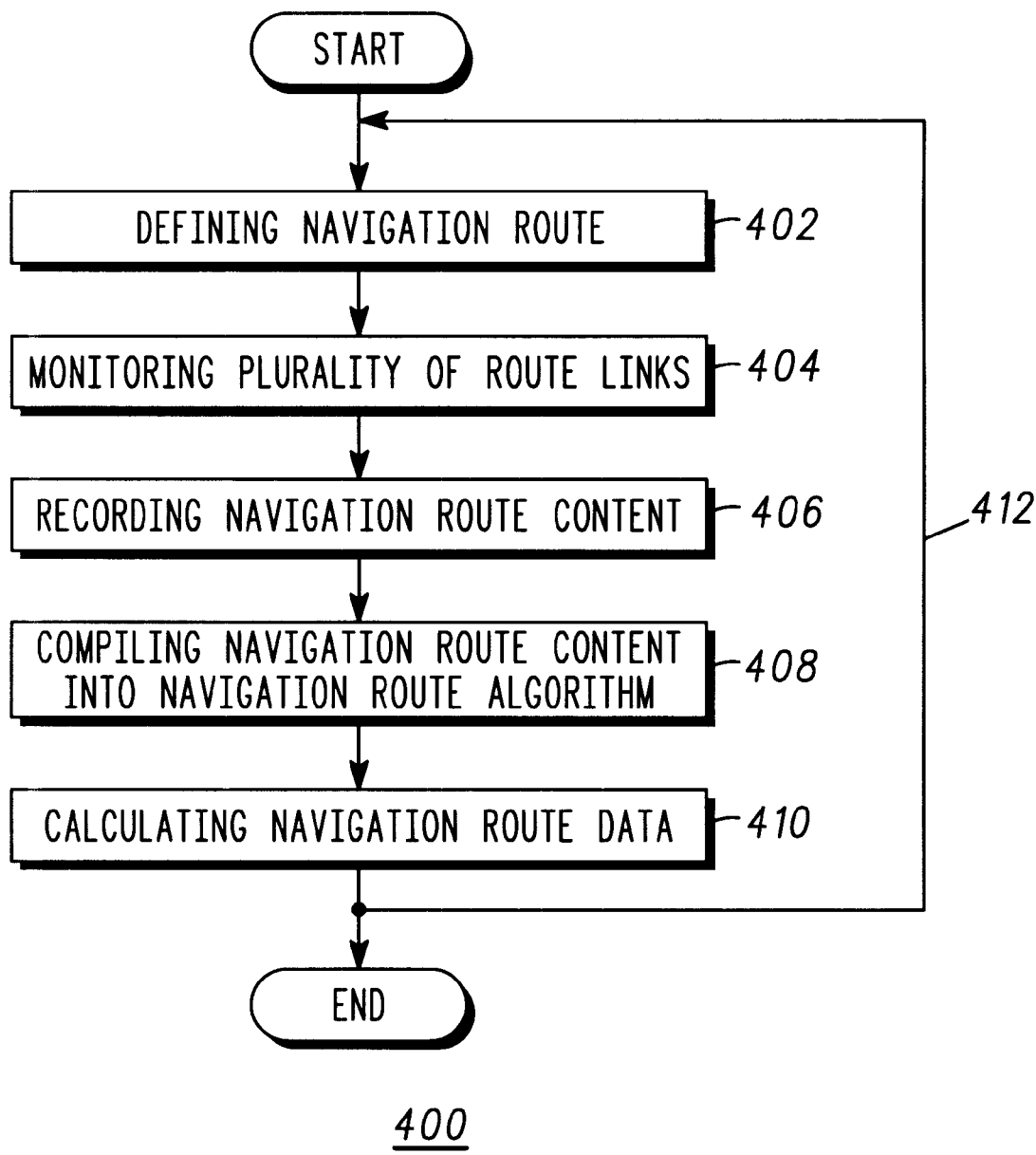
FIG. 4 shows a flow chart of a method of compiling navigation route content, according to one embodiment of the invention.

FIG. 4 shows a flow chart 400 of a method of compiling navigation route content 202, according to one embodiment of the invention. In step 402, navigation route 306 is defined between starting location 302 and destination location 304, where the navigation route 306 is comprised a plurality of route links 320–332. A user of remote communications node 104 defines navigation route 306 either directly or indirectly as described above.

In step 404, plurality of route links 320–332 are monitored by distributed communications system 100 via communications node 102 and remote communications node 104. While the plurality of route links 320–332 are monitored, navigation route content 202 is recorded as per step 406 and compiled by navigation route algorithm 204 as per step 408. The compiled navigation route content 202 is utilized to calculate navigation route data 206, which can be historical and/or predictive in nature as per step 410. The method can be repeated as often as necessary to in effect "learn" and optimize navigation route 306 by continually receiving navigation route content 202 and navigation anomaly content 208.

Figure 5:
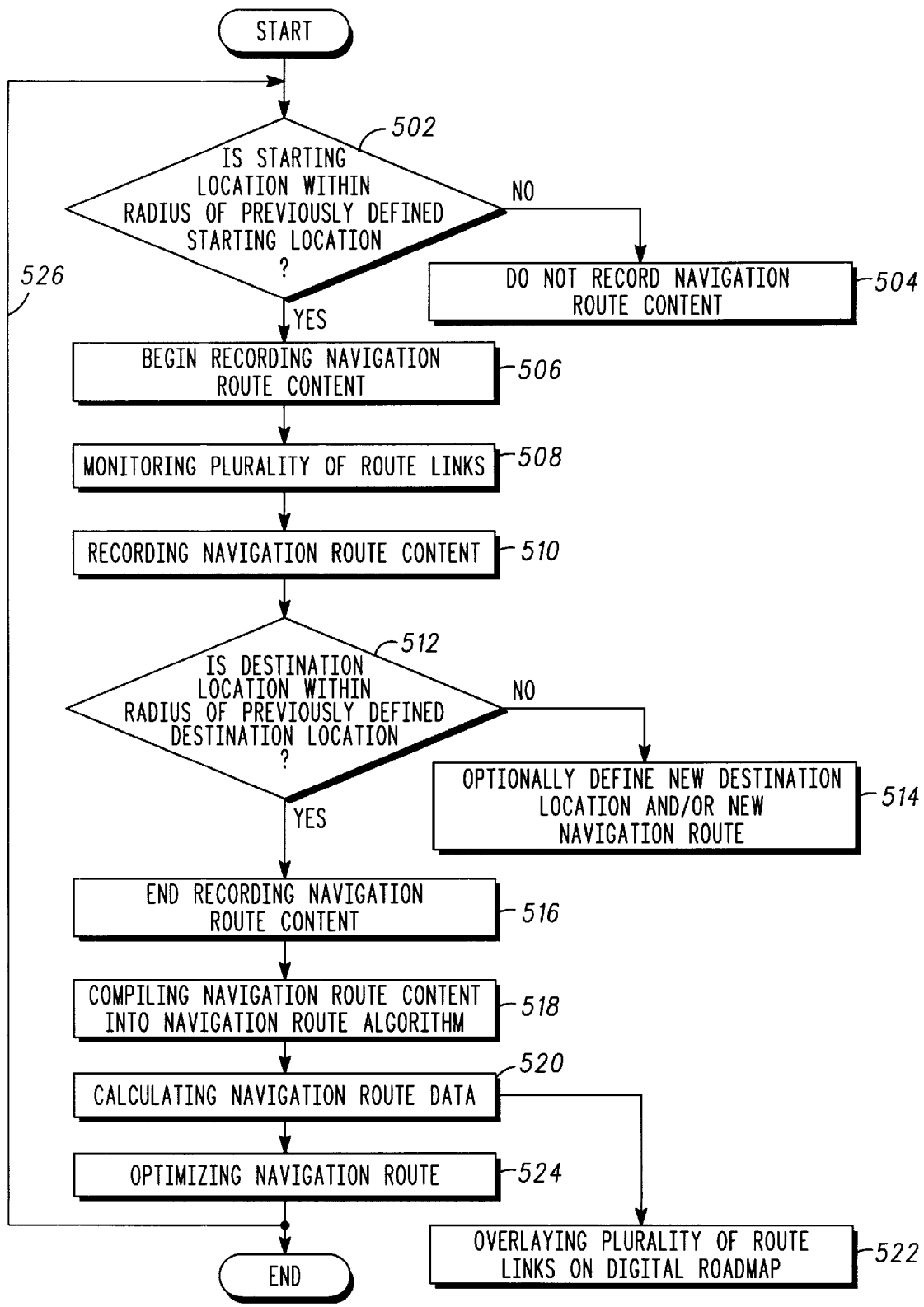
FIG. 5 shows a flow chart of a method of compiling navigation route content, according to one embodiment of the invention.

FIG. 5 shows a flow chart 500 of a method of compiling navigation route content 202, according to one embodiment of the invention. In step 502, route storing algorithm 123 on remote communications node 104 operates in conjunction with route servers 140 in communications node 102 to define a navigation route 306 by determining if a starting location 302 of a navigation route 306 is within a radius 310 of a previously defined starting location 308. If starting location 302 is not within the prescribed radius 310, navigation route content 202 is not recorded per step 504. If starting location 302 is within the prescribed radius 310 of a previously defined starting location 308, route storing algorithm 123 begins recording navigation route content 202 per step 506.

In step 508, plurality of route links 320–332 of navigation route 306 are monitored by distributed communications system 100 and remote communications node 104 so that navigation route content 202 can be recorded per step 510.

In step 512, it is determined if destination location 304 of navigation route 306 is within a radius 314 of a previously defined destination location 312. If destination location 304 is within the prescribed radius 314, route storing algorithm 123 ends recording navigation route content 202 for navigation route 306 per step 516. If destination location 304 is not within the prescribed radius 314, route storing algorithm can optionally use the starting location 302 and the new destination location to define a new destination location and/or new navigation route per step 514. Otherwise, route storing algorithm 123 can disregard navigation route content 202 recorded for that particular navigation route.

In step 518, navigation route content 202 is compiled and stored by navigation route algorithm 204. In step 520, navigation route data 206 is calculated from navigation route content 202 for navigation route 306 between starting location 302 and destination location 304. Navigation route data 206 can be historical and predictive data for navigation route 306 so that future users can make use of it to plan trips. In step 522, plurality of route links 320–332 of navigation route 306 are overlaid onto digital roadmap 360 for ease of use and editing by users.

In step 524, navigation route data 206 is optimized for navigation route 306 so as to provide plurality of route links 320–332 to operate to minimize travel time, travel distance, and the like between starting location 302 and destination location 304. In optimizing, navigation anomaly content 208 is also input into navigation route algorithm to account for real-time traffic incidents and other delays on an otherwise optimized route. This can have the effect of changing the plurality of route links that culminate in optimum navigation route 210. The foregoing steps can be repeated as often as necessary per the return arrow 526.

The invention is not limited by the starting location, destination location, number of routes or plurality of route links shown. Any route link depicted in FIG. 3 can be further broken down into any number of smaller route links. Any number of routes between a starting location and destination location can be utilized or shown, and any number of starting locations and destination locations can be input and utilized. Also any number and type of intervals can be utilized to give the desired precision in defining the navigation route and its component plurality of route links.

The method of the invention offers the advantage of collecting actual travel information from users and using that information as a component of generating customized traffic reports and optimizing navigation routes. The method of the invention also has the advantage of knowing and tracking the plurality of route links being traveled precisely including position, time and velocity data for each of the route links. This allows the creation of a highly accurate and optimized navigation route data that is updated in real-time by a plurality of users defining their own navigation routes. This has the advantage of allowing navigation route algorithm 204 to calculate an increasingly optimal navigation route for use by existing and subsequent users of the roadway network and allowing users to save additional time and cost in reaching their destinations.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of compiling navigation route content in a distributed communications system having a remote communications node, the method comprising:

defining a navigation route between a starting location and a destination location, wherein the navigation route is comprised of a plurality of route links and wherein the navigation route is defined by a user of the remote communications node;

monitoring the plurality of route links traversed by the remote communications node;

determining if the starting location is within a radius of a previously defined starting location, and wherein the remote communications node begins recording the navigation route content if the starting location is within the radius of the previously defined starting location, and wherein recording the navigation route content of each of the plurality of route links occurs in at least one of:

as the plurality of route links are traversed by the remote communications node; and in real-time;
determining if the destination location is within a radius of a previously defined destination location, and wherein the remote communications node ends recording the navigation route content if the destination location is within the radius of the previously defined destination location;
compiling the navigation route content into a navigation route algorithm; and
calculating navigation route data for the navigation route between the starting location and the destination location.

2. The method of claim 1, wherein defining the navigation route comprises activating a route storing algorithm in the remote communications node, wherein the route storing algorithm defines the starting location and the destination location of the remote communications node.

3. The method of claim 1, wherein defining the navigation route comprises determining if the starting location is within a radius of a previously defined starting location and if the destination location is within a radius of a previously defined destination location.

4. The method of claim 1, wherein the navigation route content comprises position data for each of the plurality of route links of the navigation route.

5. The method of claim 1, wherein the navigation route content comprises velocity data for each of the plurality of route links of the navigation route.

6. The method of claim 1, wherein the navigation route content comprises time data for each of the plurality of route links of the navigation route.

7. The method of claim 1, wherein recording comprises recording the navigation route content at intervals along the navigation route.

8. The method of claim 1, wherein recording comprises recording navigation anomaly content for the plurality of route links and incorporating the navigation anomaly content into the navigation route algorithm.

9. The method of claim 1, further comprising overlaying the plurality of route links for the navigation route on a digital roadmap.

10. The method of claim 1, further comprising optimizing the navigation route utilizing the navigation route data, wherein the navigation route algorithm selects the plurality of route links to minimize travel time between the starting location and the destination location.

11. The method of claim 1, further comprising optimizing the navigation route utilizing the navigation route data, wherein the navigation route algorithm selects the plurality of route links in order to minimize travel distance between the starting location and the destination location.

12. A computer-readable medium containing computer instructions for instructing a processor to perform a method of compiling navigation route content in a distributed communications system having a remote communications node, the instructions comprising:
defining a navigation route between a starting location and a destination location, wherein the navigation route is comprised of a plurality of route links and wherein the navigation route is defined by a user of the remote communications node;
monitoring the plurality of route links traversed by the remote communications node;
determining if the starting location is within a radius of a previously defined starting location, and wherein the remote communications node begins recording the navigation route content if the starting location is within the radius of the previously defined starting location, and wherein recording the navigation route content of each of the plurality of route links occurs in at least one of:
as the plurality of route links are traversed by the remote communications node; and
in real-time;
determining if the destination location is within a radius of a previously defined destination location, and wherein the remote communications node ends recording the navigation route content if the destination location is within the radius of the previously defined destination location;
compiling the navigation route content into a navigation route algorithm; and
calculating navigation route data for the navigation route between the starting location and the destination location.

13. The computer-readable medium in claim 12, wherein defining the navigation route comprises activating a route storing algorithm in the remote communications node, wherein the route storing algorithm defines the starting location and the destination location of the remote communications node.

14. The computer-readable medium in claim 12, wherein defining the navigation route comprises determining if the starting location is within a radius of a previously defined starting location and if the destination location is within a radius of a previously defined destination location.

15. The computer-readable medium in claim 12, wherein the navigation route content comprises position data for each of the plurality of route links of the navigation route.

16. The computer-readable medium in claim 14, wherein the navigation route content comprises velocity data for each of the plurality of route links of the navigation route.

17. The computer-readable medium in claim 12, wherein the navigation route content comprises time data for each of the plurality of route links of the navigation route.

18. The computer-readable medium in claim 12, wherein recording comprises recording the navigation route content at intervals along the navigation route.

19. The computer-readable medium in claim 12, wherein recording comprises recording navigation anomaly content for the plurality of route links and incorporating the navigation anomaly content into the navigation route algorithm.

20. The computer-readable medium in claim 12, further comprising overlaying the plurality of route links for the navigation route on a digital roadmap.

21. The computer-readable medium in claim 12, further comprising optimizing the navigation route utilizing the navigation route data, wherein the navigation route algorithm selects the plurality of route links to minimize travel time between the starting location and the destination location.

22. The computer-readable medium in claim 12, further comprising optimizing the navigation route utilizing the navigation route data, wherein the navigation route algorithm selects the plurality of route links in order to minimize travel distance between the starting location and the destination location.

23. A method of providing navigation route content in a distributed communications system having a remote communications node, the method comprising:
providing means for defining a navigation route between a starting location and a destination location, wherein the navigation route is comprised of a plurality of route links and wherein the navigation route is defined by a user of the remote communications node;

providing means for monitoring the plurality of route links traversed by the remote communications node;

providing means for determining if the starting location is within a radius of a previously defined starting location, and wherein the remote communications node begins recording the navigation route content if the starting location is within the radius of the previously defined starting location, and wherein recording the navigation route content of each of the plurality of route links occurs in at least one of:

as the plurality of route links are traversed by the remote communications node; and in real-time;

providing means for determining if the destination location is within a radius of a previously defined destination location, and wherein the remote communications node ends recording the navigation route content if the destination location is within the radius of the previously defined destination location;

providing means for compiling the navigation route content into a navigation route algorithm; and providing means for calculating navigation route data for the navigation route between the starting location and the destination location.

24. The method of claim 23, wherein providing means for defining activating a route storing algorithm in the remote activating a route storing algorithm in the remote communications node, wherein the route storing algorithm defines the starting location and the destination location of the remote communications node.

25. The method of claim 23, wherein providing means for defining the navigation route comprises providing means for determining if the starting location is within a radius of a previously defined starting location and if the destination location is within a radius of a previously defined destination location.

26. The method of claim 23, wherein the navigation route content comprises position data for each of the plurality of route links of the navigation route.

27. The method of claim 23, wherein the navigation route content comprises velocity data for each of the plurality of route links of the navigation route.

28. The method of claim 23, wherein the navigation route content comprises time data for each of the plurality of route links of the navigation route.

29. The method of claim 23, wherein providing means for recording comprises providing means for recording the navigation route content at intervals along the navigation route.

30. The method of claim 23, wherein providing means for recording comprises providing means for recording navigation anomaly content for the plurality of route links and incorporating the navigation anomaly content into the navigation route algorithm.

31. The method of claim 23, further comprising providing means for overlaying the plurality of route links for the navigation route on a digital roadmap.

32. The method of claim 23, further comprising providing means for optimizing the navigation route utilizing the navigation route data, wherein the navigation route algorithm selects the plurality of route links to minimize travel time between the starting location and the destination location.

33. The method of claim 23, further comprising providing means for optimizing the navigation route utilizing the navigation route data, wherein the navigation route algorithm selects the plurality of route links in order to minimize travel distance between the starting location and the destination location.

34. The method of claim 1, further comprising communicating the navigation route content to a communications node at a time interval.

35. The computer-readable medium of claim 12, further comprising communicating the navigation route content to a communications node at a time interval.

36. The method of claim 23, further comprising providing a means for communicating the navigation route content to a communications node at a time interval.

* * * * *